United States Patent
Pilu

(10) Patent No.: US 7,742,625 B2
(45) Date of Patent: Jun. 22, 2010

(54) AUTONOMOUS CAMERA HAVING EXCHANGABLE BEHAVIOURS

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1772 days.

(21) Appl. No.: 10/868,544

(22) Filed: Jun. 15, 2004

(65) Prior Publication Data

US 2005/0012830 A1 Jan. 20, 2005

(30) Foreign Application Priority Data

Jun. 27, 2003 (GB) ................................. 0314968.9

(51) Int. Cl.
  *G06K 9/00* (2006.01)
  *H04N 7/18* (2006.01)
(52) U.S. Cl. ........................ 382/107; 382/305; 348/143
(58) Field of Classification Search ................. 382/100, 382/103, 106, 107, 115, 123, 156, 168, 172, 382/181, 194, 203, 209, 224, 232, 254, 274, 382/276, 291, 305, 312; 348/172, 143; 705/35; 396/49; 700/83; 709/936; 701/1
See application file for complete search history.

(56) References Cited

U.S. PATENT DOCUMENTS

| 5,227,835 | A | * | 7/1993 | Anagnostopoulos | ......... 396/49 |
| 6,571,279 | B1 | * | 5/2003 | Herz et al. | ................... 709/217 |
| 6,970,183 | B1 | * | 11/2005 | Monroe | ..................... 348/143 |
| 7,006,881 | B1 | * | 2/2006 | Hoffberg et al. | .............. 700/83 |
| 7,054,724 | B2 | * | 5/2006 | Koshizen et al. | ................ 701/1 |
| 7,173,650 | B2 | * | 2/2007 | Cohen-Solal et al. | ....... 348/172 |
| 7,197,448 | B2 | * | 3/2007 | Fujisawa et al. | .............. 705/35 |
| 7,327,282 | B2 | * | 2/2008 | Crocker et al. | .............. 340/936 |
| 2002/0086271 | A1 | | 7/2002 | Murgia et al. | |

FOREIGN PATENT DOCUMENTS

| WO | WO 02/41273 | 5/2002 |
| WO | WO 03/009074 | 1/2003 |

OTHER PUBLICATIONS

The Patent Office, Search Report Under Section 17, Dec. 16, 2003.

* cited by examiner

*Primary Examiner*—Seyed Azarian

(57) ABSTRACT

An exemplary embodiment is a camera that includes a behaviour controller which controls the output of behaviours from the camera and the input of behaviours into the camera.

52 Claims, 6 Drawing Sheets

AUTONOMOUS CAMERA HAVING EXCHANGABLE BEHAVIOURS

TECHNICAL FIELD

The present invention relates to an autonomous camera having a mechanism for uploading and downloading camera behaviours.

BACKGROUND

The role of being a camera operator can often leave the user detached from the very event that they are trying to capture. Thus rather than participating in a family event, such as a wedding, attending a sporting event, or enjoying a holiday some people become so engrossed by the process of capturing these events on their camera that they don't truly participate in the event and merely observe the majority of the event through the view finder of the camera.

It has been proposed in the scientific literature to provide wearable cameras, see for example Starner, Schiele and Pentland, "Visual Contextual Awareness in Wearable Computing", 2nd International Symposium on Wearable Computers October 1998. Such a wearable camera is able to continually monitor the environment around a person and to capture scenes from it. Such a camera could, of course, be operated by the user but it is preferable that the camera is continually active and analyses the scenes that it has acquired in order to determine whether or not the image is "interesting". In this context "interesting" means that it would be of interest to the camera's owner.

Wearable cameras have no innate understanding of the environment around them. They therefore need to be trained to understand the visual (and other) clues presented to the camera in order to determine what images a user would like or prefer to be captured. The "rules" which a camera can apply in order to determine whether it should store an image can be considered as "behaviours". The behaviours that a camera should apply can vary depending on the position of the camera and the activity that the camera is viewing. Thus if the wearable camera were attached to a skier, then the chances are that interesting images would include those where other objects were reasonably close to the skier. However if the camera were attached to a hill-walker, then it is likely that panoramic views of scenery would be preferred. Furthermore, if a camera which had a behaviour suitable for skiing were to be used inside a shopping mall or supermarket then it is likely that almost all images would satisfy the condition of having objects sufficiently close for them to be considered interesting and hence the camera would be unlikely to show a sufficient level of discrimination and would probably capture images relating to nearly all of the time that the wearer was in the supermarket environment.

A teachable camera is disclosed in U.S. Pat. No. 5,227,835 assigned to Eastman Kodak Company. The teachable camera includes a template matching neural network which is responsive to inputs such as a focus sensor, an exposure sensor, a motion sensor and a flash control sensor, and also to a camera microprocessor, and which alters the performance of camera functions such as camera flash, shutter speed, lens focus, and aperture so that the camera characteristics are suited to the picture characteristics desired by the photographer. The neural network template can be altered by a rule based expert system executing on a personal computer.

Workers, such as Clarkson and Pentland in "Unsupervised Clustering of Ambulatory Audio and Video" proceedings of the International Conference of Acoustics, Speech and Signal Processing, Phoenix, Ariz., 1998, have disclosed a wearable camera which has used hidden markov models in order to determine the nature of the environment surrounding the camera. Thus, a camera having knowledge of the sort of images that it would see in a video store has successfully been demonstrated when it has entered another video store and is able to separate this environment from other events.

SUMMARY

Exemplary embodiments provide a system and method of an image capture device comprising a behaviour memory that stores at least one behaviour controlling automated image analysis and capture of images by the camera, and a behaviour controller that controls output of behaviours from the behaviour memory

BRIEF DESCRIPTION OF THE DRAWINGS

Embodiments will further be described, by way of example, with reference to the accompanying drawings in which.

DETAILED DESCRIPTION

Figure 1:
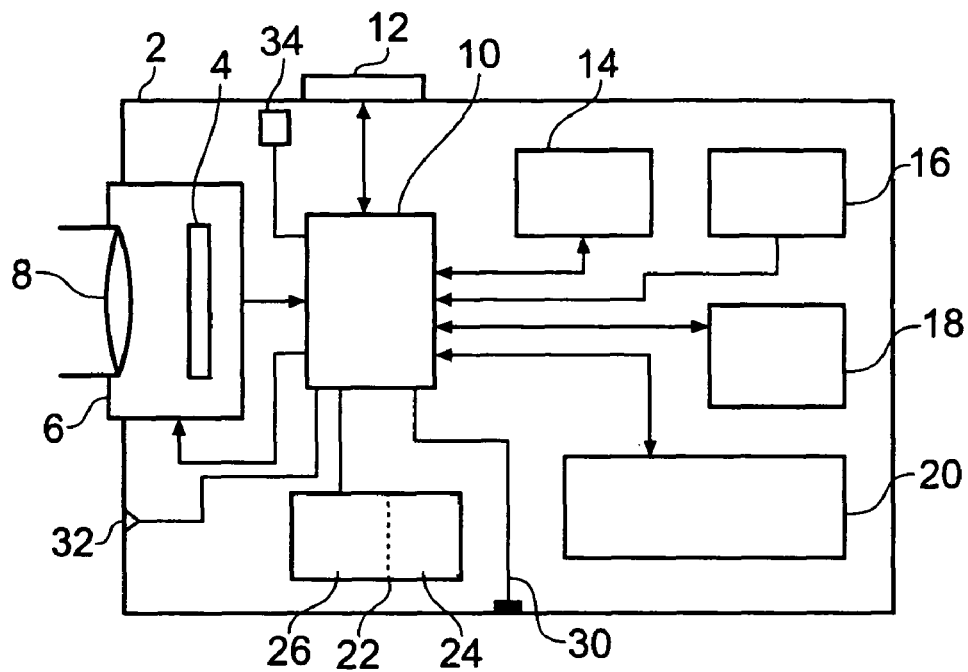
FIG. 1 schematically illustrates the components inside an autonomous wearable camera constituting an embodiment.

According to a first aspect of one embodiment there is provided a camera having a behaviour memory for storing at least one behaviour for controlling automated image analysis and capture of images by the camera, and a behaviour controller for controlling output of behaviours from the behaviour memory.

It is thus possible to provide an automated camera where an existing behaviour may be uploaded or saved for future use, or transferred to a similar camera having a behaviour memory.

Advantageously, the behaviour controller also controls input of behaviours to the behaviour memory, so that behaviours can be downloaded or received from further cameras, which are adapted to provide behaviours to the behaviour memory. The further cameras may also be able to receive behaviours in a similar fashion.

As noted hereinbefore, various embodiments of a camera can be arranged to take pictures autonomously, or at least semi-autonomously. However the rules governing the operation of the camera may need to change depending on the event that is being observed by the camera. These rules can effect not only the aesthetic considerations concerning the scene viewed by the camera, but also technical considerations to be taken into account when capturing that scene. Suppose, for example, that someone wearing a portable autonomous camera enters a tennis court. Supposing that the wearer is situated in the stands then it can be appreciated that one rule implemented within the camera may indicate that pictures are only to be captured, or subjected to further rule processing, when the court is framed in the central region of the picture captured by the camera. This could be achieved by requiring the overall image to have a high green content corresponding to grass at a lawn tennis court or a high red content corresponding to the playing surface of a clay court. Furthermore, the behaviour of the camera may be such that flash photography is inhibited when at a tennis court irrespective of the ambient level of illumination.

In one embodiment, the camera controller is responsive to indications of geographical position in order to cause modification of the camera behaviour to occur. The behaviour controller may, for example, be responsive to beacons placed in the vicinity of an event that may be observed or "consumed" by the camera and its wearer. Thus, returning to the example of the tennis match, beacons may be placed around the periphery of the tennis court in order to provide information to the camera that it is in the vicinity of the tennis court. The information provided by the beacons may include not only locational details, but may also include a voluntary behaviour and even a mandatory behaviour. The mandatory behaviour may, for example, be to cause the flash photography function of the camera to be inhibited during the time that the camera remains in communication with the beacon, until such time as the inhibition instruction is removed, or until a predetermined period of time has elapsed. These mandatory instructions may therefore be used to modify camera behaviour in accordance with an event organisers wishes. Thus, if the camera was at a wedding, for example a celebrity wedding, the bride may have concealed about her person a beacon which, depending upon her personal preferences, may either ensure that she is excluded from all images, or included in all images. The mandatory instructions may, of course, be associated with camera or user identifications such that different mandatory instructions can be sent to the different cameras. Thus authorised photographers may be able to program their cameras to ignore the mandatory instructions whereas all other users may be compelled to obey them.

Voluntary behaviours may also be made available to the camera in some embodiments. A behaviour is voluntary because the camera owner or user has a choice as to whether the camera operates in accordance with the voluntary behaviour or not. The user may set their camera such that it automatically accepts voluntary behaviours and modifies its performance accordingly. Alternatively, the user may set the camera such that it alerts them that an offer of a voluntary behaviour has been made. The camera may then use a display or other communication device in order to provide a summary or commentary on the behaviour that has been offered. This gives the user sufficient information to decide whether to download the voluntary behaviour or not. Thus, in the case of a sporting event having beacons, the beacons may offer behaviour downloads that are intended to enhance the camera's performance to capture exciting or relevant images relating to that sporting event.

Additionally and/or alternatively, camera embodiments may be responsive to other positioning systems, such as a GPS transceiver which enables the camera to accurately determine its geographical position. The presence of a camera within a specific region, or the absence of the camera within a region, may be arranged to invoke one or more predetermined behaviours. Thus, if the camera determines from its geographic position that it is at sea, then it can download behaviours which serve to ensure that the camera does not capture endless images of waves rolling towards it, but instead becomes sensitised to other features, such as capturing images aboard a ship or images of marine life. Furthermore the technical behaviour of the camera may also be varied and thus, for example, a polarising or other suitable filter may automatically be included within the optical path of the camera so as to reduce glare from the surface of the sea.

Different behaviours can thus be devised for different situations and positions. Whilst it may be feasible for a camera user to train the camera, it is far more convenient for the user to be able to download or otherwise import camera behaviour control programs or programs from other sources. Thus libraries of camera behaviours can be created and these libraries can be made accessible to users, either on a free or paying basis, as appropriate, in order that users can customise the response of their camera for particular situations. Such library downloads may be achieved by establishing communication with a behaviour library server over a mobile telecommunications device which may be external to the camera. An exemplary device would be a mobile telephone with an infrared link which could communicate with the camera via the camera's infrared link or via some other communications media such as a Bluetooth. Alternatively, the camera embodiments may have a telecommunications device integrated with it, or alternatively a telecommunications device may have a camera included within it. Mobile telephones having cameras integrated therein are already commercially available. Furthermore other hand held computing devices such as personal digital assistants may also include the necessary functionality or have integrated therein both an imaging element and a telecommunications element.

The library may require the user or their camera embodiments to authenticate their identity by revealing a shared secret such as a password or even biometric data. An electronic camera is particularly suited for user identifications based on iris pattern since the camera already includes a high resolution imaging device.

A user may develop their own camera behaviour or modify camera behaviours and save these within the library, possibly within their own restricted space or to other behaviour stores. Such modified behaviours, or indeed behaviours in general, may include private sub-behaviours which a user may wish to be held secret and will not be disclosed. Such private or secret behaviours may be to seek to include or exclude particular people from image capture. Use of secure computing platforms, such as platforms in accordance with the Trusted Computing Platform Alliance (TCPA) architecture may be used in order to ensure that secrets within the behaviours are not made available to an unauthorised user or cannot be subverted for other purposes. The TCPA specification can be found at www.trustedcomputing.org.

The instructions for controlling the camera behaviour are provided in machine independent format such that the same behaviour can be used on any suitably enabled camera irrespective of its manufacturer or internal computing devices. Thus the instructions could be written in a mark-up language, for example XML, and interpreted within the camera.

One embodiment of a camera includes a long term image store for storing the images that it deems appropriate to capture. The camera may also include a short term image store, or buffer, in which the last few minutes of images are temporarily stored. Thus use of the buffer enables a user to intervene to select a recently required image for storage. The buffer also enables the camera to perform analysis of the evolution of events in order to determine which of these events are likely to be interesting. Thus, for example, if a camera was operating with a news gathering or "reporter" behaviour and it determined from its image analysis that someone was lying on the ground, possibly with others in attendance or with blood being visible, then the camera embodiments could interrogate the buffer memory in order to capture either a series of stills or a movie clip leading up to the relevant event.

Camera embodiments may be operable to generate still images and moving images of its environment.

Camera embodiments may include additional sensors. Such sensors may include a microphone, motion sensors, or even biometric sensors, such as a heart rate sensor and direction of look sensors in order to obtain cues from the camera wearer. The microphone can be used to associate an audio track with a moving or still image. However the microphone also provides an input to the behaviour processor in order to enable it to determine what images are likely to be interesting. Thus, the sound of a gunshot would be significant to the news gathering behaviour discussed above, whereas the sound of a ball on a racket and the cheering or roar of a crowd can be used by a "tennis match" behaviour in order to determine when a significant event may have occurred within a tennis match.

Motion of the user's head may also be used as an input to camera embodiments. Workers, such as Langton, Watt and Bruce "Do the Eyes have it? Cue to the Direction of Social Attention", Trends in Cognitive Neuroscience, 4(2):50-59, 2000, proposed four modes of observation used by humans. These include an "intentionality detector" which is a mechanism associated with self propelled motion such as reaching for a pen or moving towards a sofa and are detected in terms of a dyadic relationship (a desire or a goal) between a self propelled object and another one. An eye direction detector, or direction of gaze detector is also an important visual cue since users will generally fixate for longer on an item that is of particular interest to them. These user actions can give the camera information that it can use to determine if an "interesting" image currently exists. Other biometric data such as increased heart rate or skin conductivity may also be used as cues, for example, to show that the wearer is excited.

The behaviours may also describe when a camera embodiment is most definitely not to take and store any images. Consider a person who has been wearing a camera embodiment all day for whatever reason. It is likely that during this time they will have needed to visit a lavatory. It would generally be considered undesirable to capture images inside the lavatory and hence specific behaviour models may be invoked in order to inhibit the image sensors of the camera, or lavatory beacons may be provided in or adjacent to such facilities. For commonly used behaviours, such as the lavatory behaviour, the behaviours may be permanently stored within part of the behaviour memory such that they can be invoked at any time. Such behaviours may be associated with a code, such as a bar code or colour pattern code which may be displayed in or adjacent to lavatories in order to invoke the required behaviour. Thus it is apparent that visual beacons may also be used in order to cause a modification of camera behaviour.

According to alternative embodiments, there is provided a camera having a behaviour memory for storing at least one behaviour for controlling automated image analysis and capture of images by the camera and a behaviour controller for controlling input and output of behaviours between the behaviour memory and another camera having a behaviour memory.

According to alternative embodiments, there is provided a behaviour server for storing a plurality of camera behaviours, wherein the server is arranged to establish a communications channel with a camera, wherein the user can upload a camera behaviour to the server.

According to alternative embodiments, there is provided a method of modifying the operation of a camera, the method comprising the steps of monitoring the position of the camera, and in response to reaching a predetermined geographical position, performing at least one action selected from implementing a new behaviour and alerting the user to the option of implementing a new behaviour.

According to alternative embodiments, there is provided a method of modifying the operation of a camera having a behaviour memory, the method comprising the steps of monitoring the presence of beacons, and in response to being in the presence of a beacon, performing at least one action selected from implementing a new behaviour and alerting a user to the option of implementing a new behaviour.

According to alternative embodiments, there is provided a camera having a behaviour memory for storing at least one behaviour for controlling automated image analysis and capture of images by the camera, wherein the camera is responsive to geographical position, and in response to reaching a predetermined geographical position, the camera carries out at least one of implementing a new behaviour and alerting a user to the option of implementing a new behaviour.

According to alternative embodiments, there is provided a method of modifying the operation of a camera having a behaviour memory, the method comprising the steps of monitoring the presence of beacons, and in response to being in the presence of a beacon, performing at least one action selected from implementing a new behaviour and alerting a user to the option of implementing a new behaviour.

According to alternative embodiments, there is provided a camera having a behaviour memory for storing at least one behaviour for controlling automated image analysis and capture of images by the camera, wherein the camera is responsive to beacons, and in response to being in the presence of a beacon, the camera carries out one action selected from a list comprising implementing a new behaviour and alerting a user to the option of implementing a new behaviour.

According to alternative embodiments, there is provided a behaviour beacon arranged to transmit a signal that can be received and interpreted by suitably configured mobile devices for invoking a change in operation.

According to alternative embodiments, there is provided a mobile device having a behaviour memory for storing at least one behaviour for controlling automated image analysis and capture of images by the mobile device, and a behaviour exchange controller for controlling the exchange of behaviours with the behaviour memory, including output of behaviours from the behaviour memory.

A camera, generally designated 2, is shown in FIG. 1. The camera comprises an image capture element 4, such as, but not limited to, a charge coupled device array in association with an optical system 6. The optical system 6 generally includes a lens 8 (which may be a compound lens) together with a lens focus mechanism and an aperture control mechanism, both of which are commonly provided on cameras and hence do not need to be described further here. The images captured on the image capture element 4 are provided to a data processor 10. The data processor 10 provides an output to the aperture and focus controller in order to ensure that intensity and focus control are performed in accordance with known photographic principles. The data processor 10 also has bidirectional communication with a user interface 12 which typically comprises a liquid crystal display screen for displaying images and menus, together with cursor control and other buttons or switches to enable the user to input their desires and choices into the camera. The user interface 12 will also typically include a zoom control button and a shutter button. Thus, the user interface 12 is typical of that found in electronic cameras. The data processor 10 is also in communication with a behaviour memory 14 which can store data defining rules used to control the camera 2, and in particular to control automated image capture by the camera 2 in response to detection by the camera's sensor (including its image capture components) of one or more events as specified by the rules. Such events may, for example, be specified sporting activities observed by the image capture apparatus or physical motion of the camera 2 resulting from movement made by a person who is wearing the camera 2. The data specifying the rules prescribing the actions/responses made by the camera 2 to various events can be regarded as defining a "camera behaviour". The data processor 10 is arranged to control the import or export of camera 2 behaviours to or from the behaviour memory 14, and also execute camera behaviours such that the camera can automatically capture images in accordance with the rules of a camera behaviour contained within the behaviour memory 14. The data processor 10 is also in communication with a positioning determining device 16 which typically comprises a GPS module. The data processor 10 is also in communication with telecommunications devices 18 and 20. Telecommunications device 18 may, for example, be an infrared device, a Bluetooth device or other local communication device which can detect the presence of local behaviour beacons and communicate with them to perform the download, and optionally upload, of behaviours. The telecommunications device 20 is typically a mobile telephone component such that the camera 2 can access remote libraries via the mobile telephone infrastructure. The data processor 10 is also in communication with an image store 22 which is typically subdivided into a long term image store 24 and a short term image store 26. Images which have been captured for subsequent extraction are stored in the image store 24, whereas the temporary image store 26 functions as a working area such that the evolution of events may be analysed in order to determine whether they are "interesting". The data processor 10 is also connected to a data exchange bus 30 such that physical connection may be made between the camera and some other computing device for the download/extraction of stored images from the image store 24 or the modification of behaviours directly from the computing device (not shown). The data processor 10 may also be connected to motion sensors 34 (such as inertial sensors or gyroscopes) so as to be responsive to user movement. In the present embodiment the processor 10 is also adapted to control the input/output facilities provided by the wireless (in this example Bluetooth) port 18, GPRS connection port 20 or the USB port 30 in order to load a camera behaviour into the behaviour memory 14. Thus the processor controls the input of behaviours to the behaviour memory 14, with behaviours usually being input pursuant to downloading them from an external source (which will be described in more detail subsequently), and the output of behaviours from the behaviour memory 14. Output of a behaviour includes the transfer of a behaviour to a behaviour store (i.e. uploading a behaviour), deletion of a behaviour, or depending on camera configuration the transfer of a behaviour to a further memory where the rules are interpreted by the data processor 10 such that the camera 2 operates in accordance with the behaviour.

Figure 2:
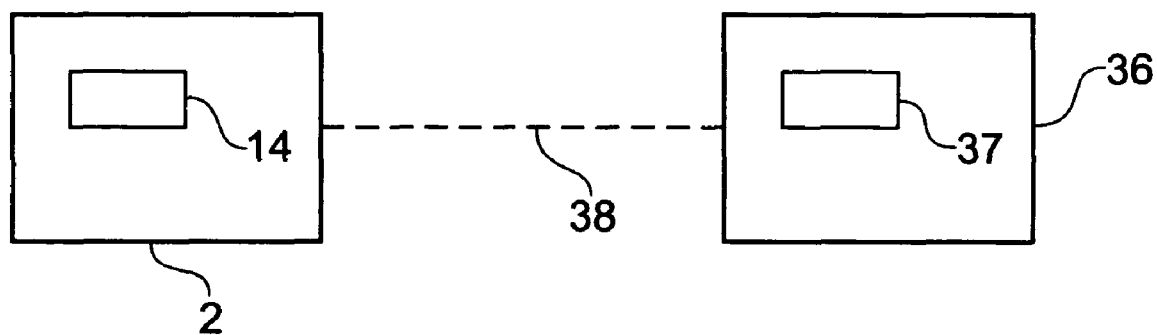
FIG. 2 schematically illustrates communication between two cameras.

In a preferred embodiment, shown in FIG. 2, the camera 2 can communicate directly with a similar camera 36 which also comprises a data processor, behaviour memory 37 and a communications device. This communications device can be an infrared or Bluetooth device, mobile telephone component, or a port for a cable connection. Thus the camera 2 can transfer behaviours to and from the behaviour memory 37 of the similar camera 36 over a communications link 38. Similarly, the similar camera 36 can transfer behaviours to and from the behaviour memory 14 of the camera 2. In this way, the two cameras 2, 36 can exchange behaviours. Such an exchange may require interaction by the user of one or both the cameras 2, 36.

In one embodiment, the behaviour memory 14 is a removable memory card such as a flash memory card or the like. The memory card containing one or more behaviours can be removed from one camera and inserted into a further camera which implements a behaviour from the memory card. Thus a user may have two cameras, for example a compact camera for everyday shots and a high-quality but larger camera for specialist photography. The user can easily implement the same behaviour within the cameras by inserting the memory card into the camera being used.

It should be noted that workers have already demonstrated that wearable cameras are capable of automatically detecting events. Detection of such events is usually performed using time series analysis methods such as the hidden Markov model. This model has been developed for use in voice recognition systems, see Lawrence R. Rabiner, "A Tutorial on Hidden Markov Models and Selected Applications in Speech Recognition", proceedings of the IEEE, 77(2):257-286, 1989. Hidden Markov models have successfully been used, see for example Clarkson and Pentland, "Unsupervised Clustering of Ambulatory Audio and Video" (reference given hereinabove) and Yamato, Ohia, Ishii, "Recognising Human Action in Time Sequential Images using Hidden Markov Models" proceedings of Computer Vision and Pattern Recognition conference, pages 379-385, 1992. The hidden Markov model is a stochastic space model of the temporal structure of the input variables. These models are usually trained on example patterns. Thus, in one particular mode of operation a hidden Markov model could be trained to detect the characteristic head motion and audio intensity during a tennis match and another to detect the situation when a point was scored, which is most likely characterised by the typical cheer of the crowd and the relatively steady head motion. When the camera is at a tennis match (which can be categorised as a place or an event) and these two hidden Markov models (and perhaps others) are matched against the stream of sensor data, for example data from the microphone 32, from a motion sensor 34 (such as, but not limited to, a gyroscope) or from other user sensors (not shown) which may interface with the camera via the telecommunications device 18 (FIG. 1), the camera 2 can infer when a particular event has occurred.

Each hidden Markov model can be used as a classifier yielding a probability that a particular situation that they have been trained on is occurring. By running several such classifiers in parallel and comparing the relative probabilities the camera can detect situations of interest. Thus, in the situation described above where the roar of the crowd is detected, the second Markov model would yield the highest probability when a point has recently been scored and the camera could then save the last 5 or 10 seconds of video from the buffer 26 to the long term image store 24.

Figure 3:
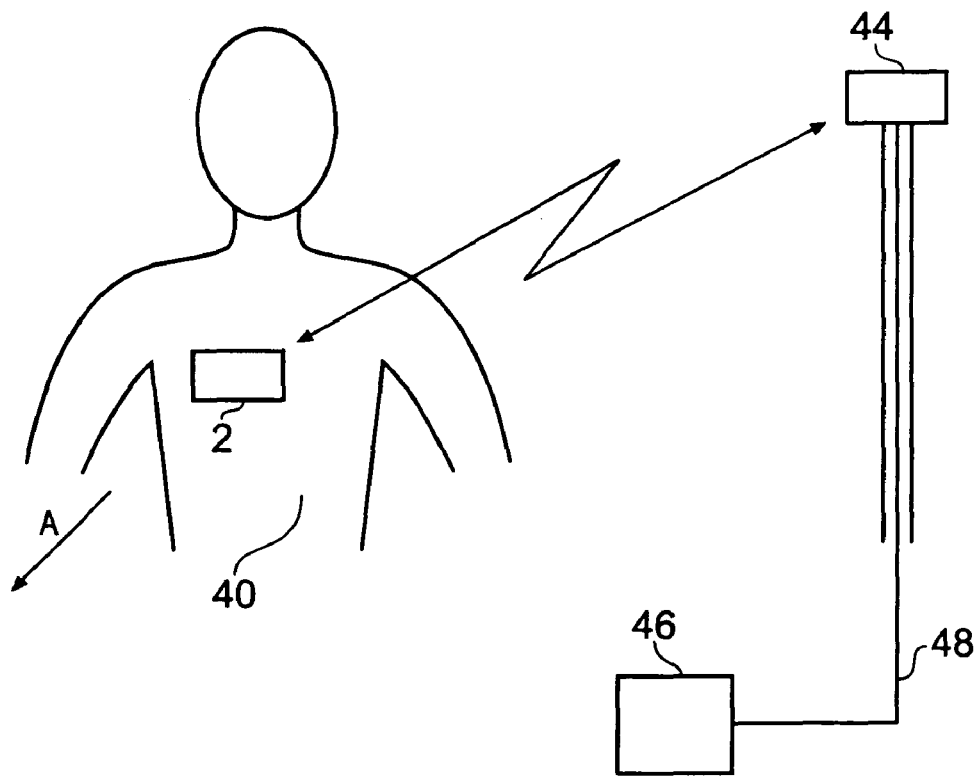
FIG. 3 schematically illustrates communication between a camera and an event beacon.

In accordance with one embodiment, the various models, whether in their entirety or whether in a parametised form can be transferred to and from the behaviour memory 14. FIG. 3 schematically illustrates an arrangement in which a user 40 wearing the camera 2 is travelling in a direction indicated by the arrow A. During this motion the user passes a model beacon 44 which stores a model therein and has a data processor and a communications device such that the beacon 44 can establish communication with the camera 2. The beacon 44 could simply repeatedly transmit a descriptor of the model and the model itself using a high bandwidth interface such that the entire download of the model could be easily accomplished during the duration of the time that the use is in communication range with the beacon 44. Alternatively, the beacon 44 may be in communication with a model server 46 via a further communications path 48. Thus the beacon 44 serves as a local point of presence for the server 46. In this scenario the camera uses the beacon 44 to establish communication with the server 46. Such a scenario is useful where the server 46 owner wishes to authenticate the camera and user's identity (which may be stored in a further memory area within the camera 2) in order that the server owner can seek payment from the camera user before authorising download of a modified behaviour to the camera 2.

Figure 4:
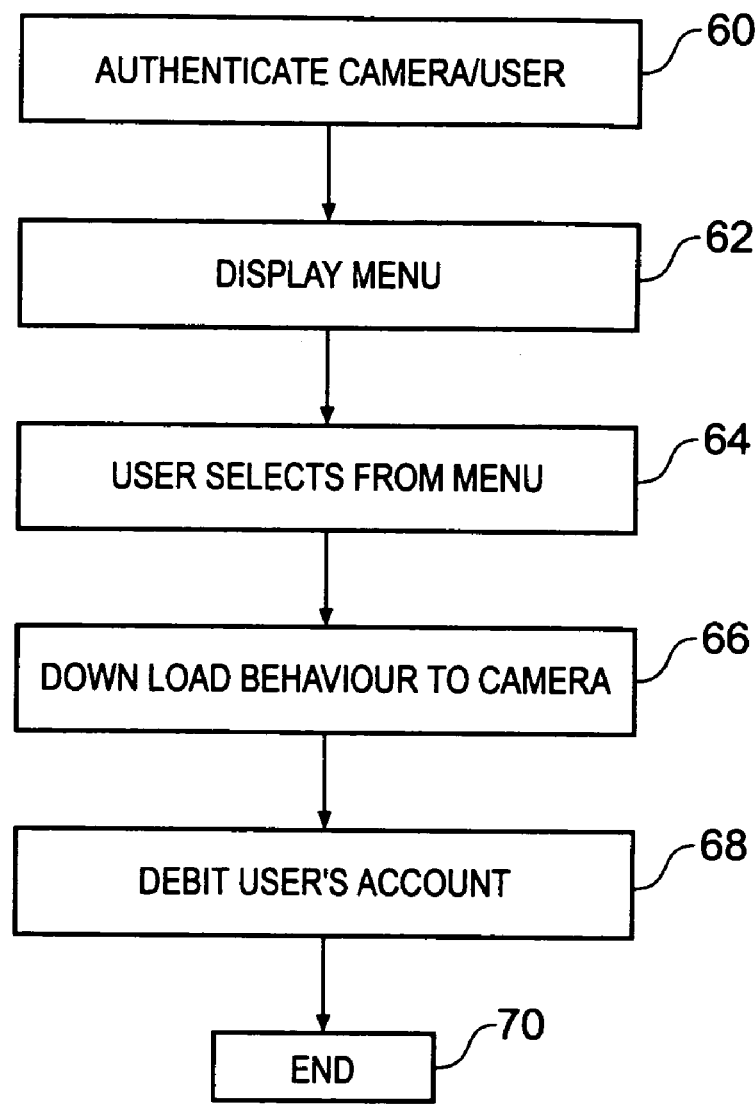
FIG. 4 illustrates the process for downloading behaviours from a behaviour library.
Figure 5:
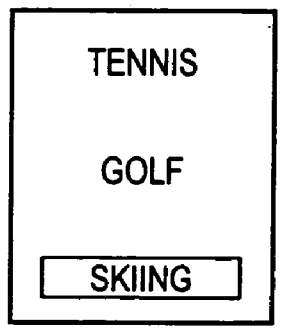
FIG. 5 illustrates a menu presented to a user for selecting behaviours.

A process where the camera 2 authenticates with a remote server, either via the cellular telephone infrastructure or via a local point of presence is shown in FIG. 4. The process commences at step 60 where the camera 2 and server establish secure communications with one another and then authenticate identities, for example by exchange of a secret which had been defined during a prior registration process with the server. Following authentication, control passes to step 62 where a menu, or a hierarchical menu of options is displayed to the user. Such a menu can be displayed by use of the LCD device incorporated within the camera. The user can use the cursor buttons provided on the camera 2 in order to select a desired behaviour from the menu at step 64. Control then passes to step 66 where the appropriate behaviour is downloaded from the server (which acts as a library or a repository of camera behaviour) to the camera 2. The download may include a hand shaking process such that data integrity and completion of the download can be verified. Once the download is complete, control optionally passes to step 68 where the user's account is debited and from then to step 70 where the process is terminated by performing a hand off on the communications channel and closing the channel. Due to the limited capabilities for displaying text of the LCD device of a camera 2, a simple drop down memory of the type shown in FIG. 5 may be used. Thus in FIG. 5 sports behaviours have been selected and the options "tennis", "golf", and "skiing" are provided. The user uses cursor control buttons on the back of the camera 2 to highlight the appropriate option and then manipulates a further camera button in order to confirm their choice. Of course, a camera 2 may have a behaviour memory of sufficient size to store several behaviours. In such a case the user may use a menu, of the type shown in FIG. 5, for example, to select a behaviour from the ones stored in the behaviour memory.

FIGS. 6-10 illustrate flow diagrams for controlling operation of one or more camera behaviours in various exemplary embodiments. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 6-10 or may include additional functions without departing significantly from the functionality of the embodiment. For example, two blocks shown in succession in FIGS. 6-10 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

Figure 6:
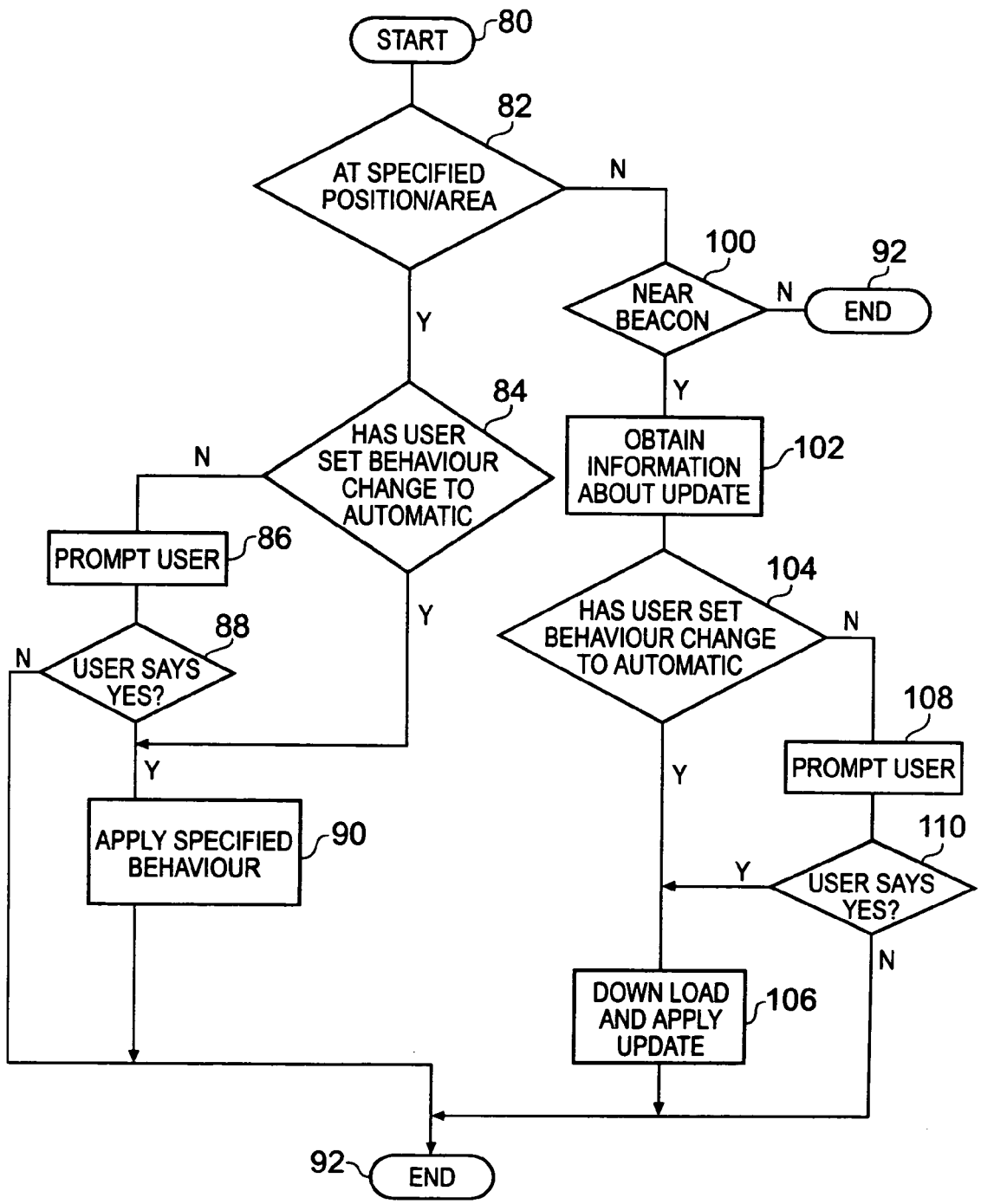
FIGS. 6-10 illustrate flow diagrams for controlling operation of one or more camera behaviours in various exemplary embodiments.

As noted hereinbefore, in what is either an alternative manner of selecting/downloading a behaviour, or a way of augmenting a behaviour already selected or downloaded the camera 2 can be arranged to change its behaviour in response to geographical position. FIG. 6 illustrates a flow chart for performing this with one exemplary embodiment. Control is commenced at step 80 and then passes to step 82 where the GPS system is interrogated to discover the current position of the camera 2. This is then compared with position descriptors associated with behaviours held in the behaviour memory 14 (which could be either a modification of a behaviour already stored in the memory 14, or downloading a new behaviour). If the camera 2 is in a specified area or region as defined by the behaviour descriptors, then control passes to step 84 where a test is made to see whether the user has set the camera 2 to enable automatic update of behaviour. If step 84 determines that automatic update has not been set, then control passes to step 86 where the user is informed that a new behaviour is appropriate and from then on control passes to step 88 where the user is asked whether the new behaviour should be implemented. If the user indicates that it should be, then control passes to step 90 where the new behaviour is applied, otherwise control is passed to step 92 which represents the end of the procedure. Returning to step 84, if behaviour update has been set to occur automatically, then control passes directly from step 84 to step 90.

Returning to step 82, if the user is not in a specified predefined area for which they have predefined the behaviour to be used, then control passes to step 100 where the telecommunications device 18 is interrogated to see if the camera 2 is near a beacon. Furthermore recent video images may also be scanned in order to determine if a visual beacon has been detected. If the camera 2 is not near a beacon, then control is passed to step 92, otherwise control is passed to step 102 where information about the update is obtained from the beacon, if such information is available. From step 102 control is passed to step 104 where a test is made to see if the user has set the camera 2 for automatic update. If the user has set the camera 2 for automatic update, then control is passed to step 106 where the behaviour update is downloaded and applied, and from there control passes to step 92. Returning to step 104, if the camera 2 has not been set to automatically update its behaviour, then control is passed to step 108 where a prompt is issued to the user and from then to step 110 where a test is made to see whether the user has authorised the update. If the user authorises the update then control is passed to step 106, otherwise control is passed to step 92.

The procedure shown in FIG. 6 can be repeated periodically in order to check whether the camera 2 behaviour should be modified.

Rather than merely relying on the proximity of a beacon the user can also use the camera interface in order to force a connection via the mobile telephone component to a suitable enabled server 46 in order to invoke the procedure shown in FIG. 4 or indeed to instruct the camera 2 to upload its current behaviour to a space reserved for that user.

Figure 7:
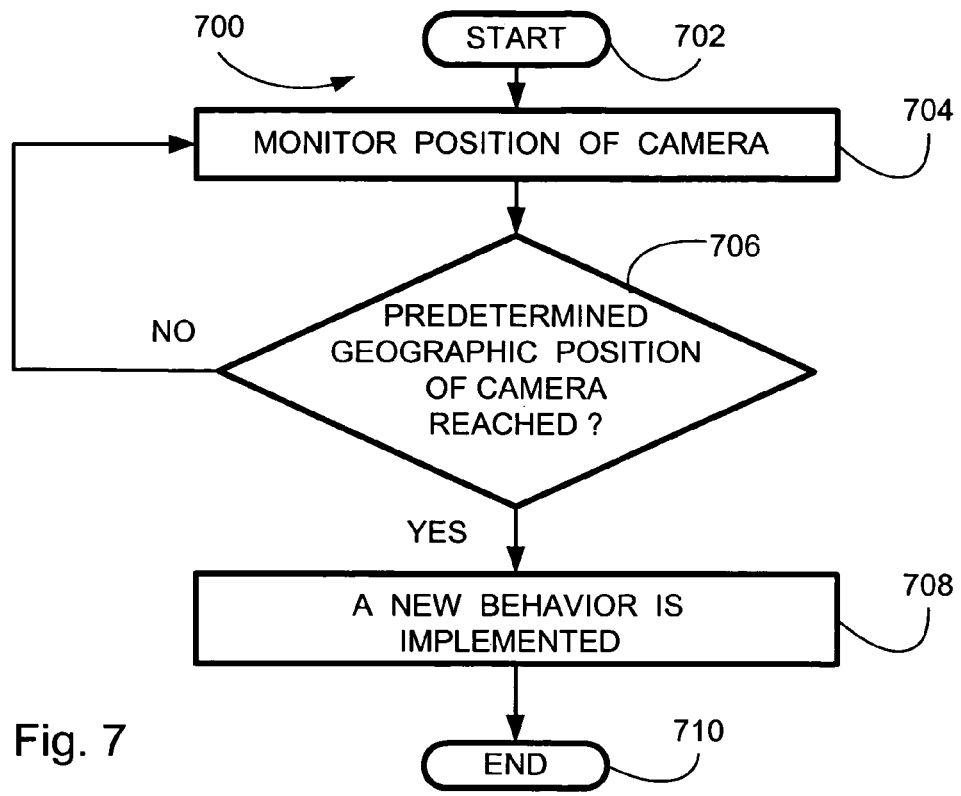

FIG. 7 illustrates a flow diagram 700 for controlling operation of one or more camera behaviours in an exemplary embodiment. The process starts at block 702. At block 704 position of the camera is monitored. At block 706, a determination is made whether a predetermined geographical position is reached. If not, the process returns to block 704. If yes, the process proceeds to block 708. At block 708, a new behaviour is implemented. The process ends at block 710.

Figure 8:
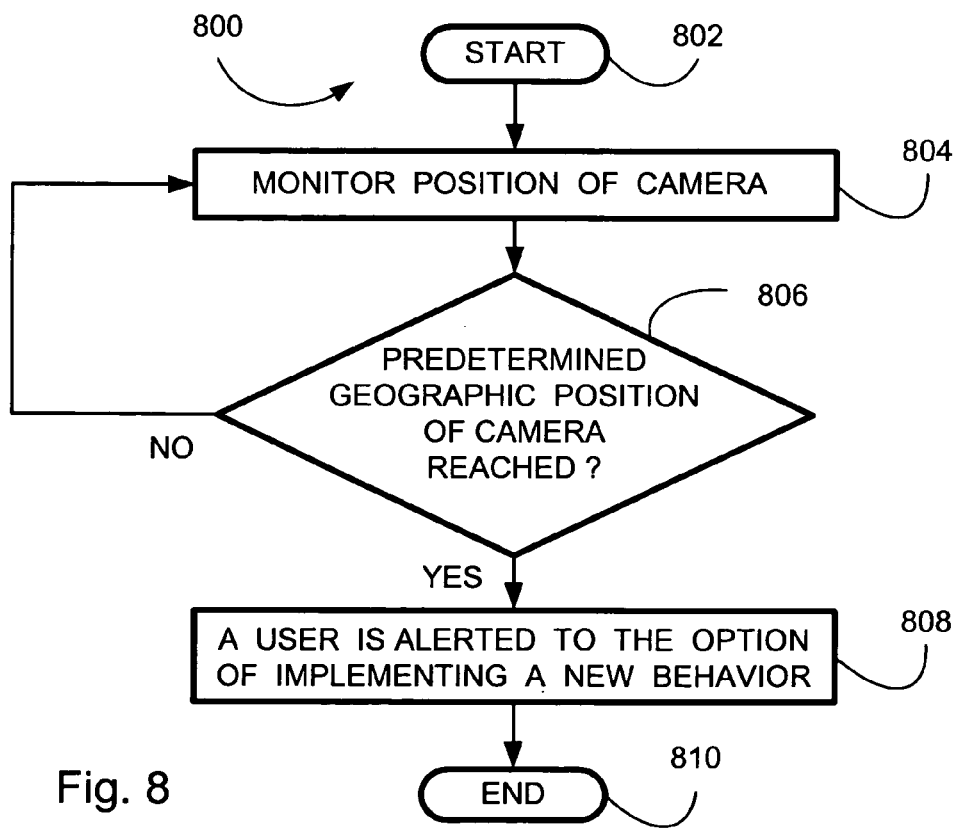

FIG. 8 illustrates a flow diagram 800 for controlling operation of one or more camera behaviours in another exemplary embodiment. The process starts at block 802. At block 804 position of the camera is monitored. At block 806, a determination is made whether a predetermined geographical position is reached. If not, the process returns to block 804. If yes, the process proceeds to block 808. At block 808, a user is alerted to the option of implementing a new behaviour. The process ends at block 810.

Figure 9:
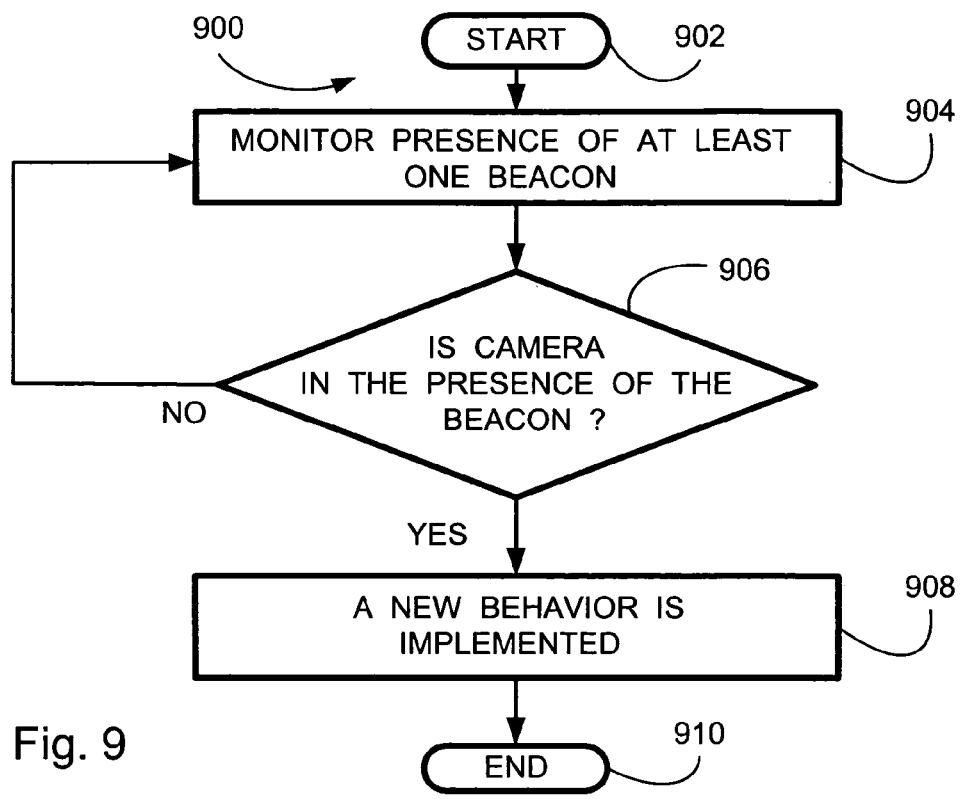

FIG. 9 illustrates a flow diagram 900 for controlling operation of one or more camera behaviours in another exemplary embodiment. The process starts at block 902. At block 904 the presence of at least one beacon is monitored. At block 906, a determination is made whether the camera is in the presence of the beacon. If not, the process returns to block 904. If yes, the process proceeds to block 908. At block 908, a new behaviour is implemented. The process ends at block 910.

Figure 10:
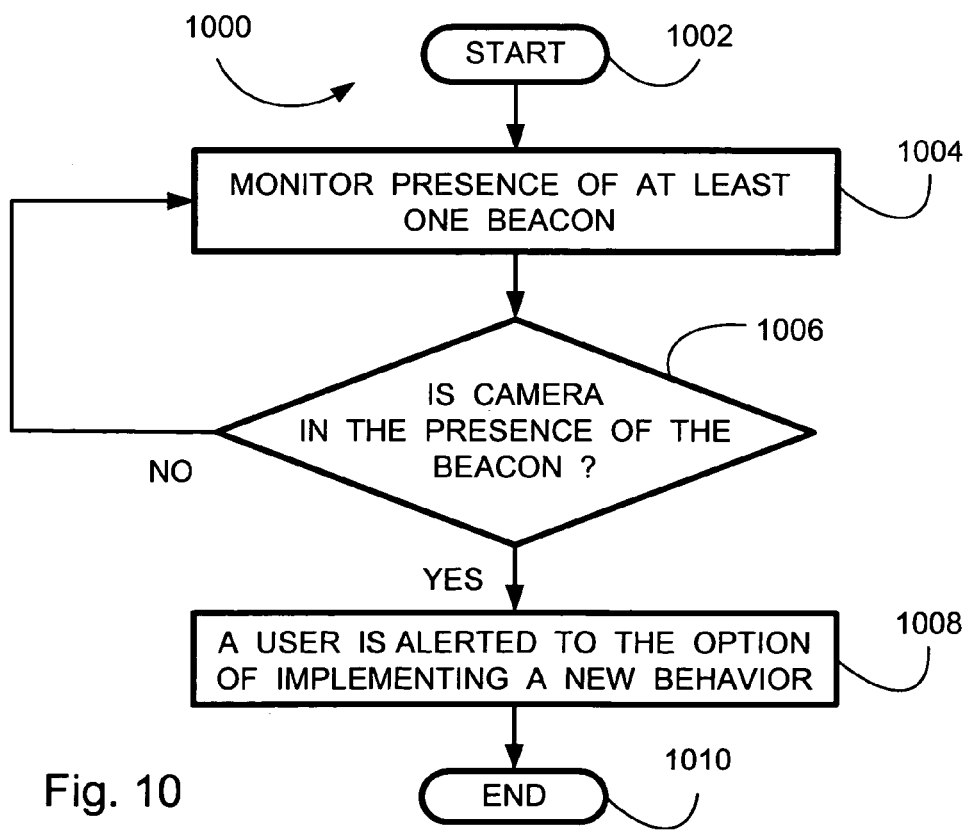

FIG. 10 illustrates a flow diagram 1000 for controlling operation of one or more camera behaviours in another exemplary embodiment. The process starts at block 1002. At block 1004 the presence of at least one beacon is monitored. At block 1006, a determination is made whether the camera is in the presence of the beacon. If not, the process returns to block 1004. If yes, the process proceeds to block 1008. At block 1008, a user is alerted to the option of implementing a new behaviour. The process ends at block 1010.

The camera 2 can be arranged to modify its behaviour model, either through unsupervised teaching (see Clarkson and Pentland) or by supervised learning wherein the user participates in training of the camera 2. The camera 2 can therefore associate a confidence value with the behaviour implemented within the camera 2. The camera 2 can upload both the behaviour and the confidence value when the camera 2 owner wishes to store the behaviour. The upload process can be further modified such that automatic and periodic uploads of camera behaviour occur. Uploads of behaviours may be inhibited when the confidence value is below a predetermined threshold, or such uploads may require specific user intervention. The behaviour and image analysis could be performed in a processing unit remote from the image capture components. Thus, if sufficient bandwidth was available, a remote camera 2 could transmit its video back to a computing device which could then perform the analysis described herein. Alternatively, a camera 2 could store video into a storage device, and the video store could be analysed at a later date again to automatically select images using the processes described herein.

A camera 2 embodiment may require the user to identify themselves, for example via a password or biometric data (iris scanning can be implemented within a camera 2) before implementation of exchange (upload or download) of camera behaviours is authorised. This security mechanism system may be implemented by the data processor.

It is thus possible to provide a mechanism for exchanging camera behaviours with an autonomous camera 2 embodiment.

The invention claimed is:

1. A teachable camera comprising:
    a behaviour memory that stores at least one behaviour controlling automated image analysis and capture of images by the camera; and
    a behaviour controller that controls output of behaviours from the behaviour memory, each of said behaviours specifying at least one rule for determining whether or not an image should be stored so that it is not discarded as other images are acquired.

2. The camera as claimed in claim 1, in which the camera uploads at least one behaviour to a behaviour library.

3. The camera as claimed in claim 1, in which the behaviour controller is adapted to upload at least one behaviour to another camera having another behaviour memory.

4. The camera as claimed in claim 1, wherein the behaviour controller also controls input of at least one behaviour to the behaviour memory.

5. The camera according to claim 4, wherein the behaviour controller is adapted to control at least one input of a behaviour from a source external of the camera.

6. The camera according to claim 5, wherein the behaviour controller is adapted to input the behaviour from the source external of the camera by obtaining data from the source external to modify the behaviour within the behaviour memory.

7. The camera as claimed in claim 5, wherein the behaviour controller is adapted to input the behaviour from another camera having another behaviour memory.

8. The camera as claimed in claim 4, in which the camera downloads behaviours from a behaviour library.

9. The camera as claimed in claim 8, in which the behaviour library requires registration and the camera must authenticate with a library access control prior to being able to obtain behaviours from the library.

10. The camera as claimed in claim 8, in which the behaviour library requires payment and the camera must authenticate with a library access control prior to being able to obtain behaviours from the library.

11. The camera according to claim 1, wherein the behaviour controller is adapted to modify a behaviour within the behaviour memory using a learning process involving a user.

12. The camera according to claim 1, wherein the behaviour memory is removable.

13. The camera as claimed in claim 1, wherein the behaviour controller is responsive to indications of geographical position.

14. The camera as claimed in claim 13, wherein the behaviour controller is responsive to beacons placed at events or places to indicate that the camera is at an event.

15. The camera as claimed in claim 14, in which the behaviour controller downloads a behaviour from the beacons.

16. The camera as claimed in claim 13, wherein the behaviour controller is responsive to beacons placed at events or places to indicate that the camera is at a specific place.

17. The camera as claimed in claim 13, in which the behaviour controller is responsive to a GPS positioning system and wherein behaviours can be invoked in response to the position of the camera.

18. The camera as claimed in claim 1, in which the camera includes a behaviour interpreter.

19. The camera as claimed in claim 1, wherein the behaviour controller includes a security system that prevents unauthorised export of behaviours.

20. The camera as claimed in claim 19, in which the security system requires a user to identify themselves by revealing a shared secret to the security system in order to initiate export of the behaviour.

21. The camera as claimed in claim 19, in which the security system is responsive to biometric data of a user.

22. The camera as claimed in claim 1, wherein the behaviour controller includes a security system preventing unauthorised initiation of behaviours.

23. The camera as claimed in claim 22, in which the security system requires a user to identify themselves by revealing a shared secret to the security system in order to initiate use of a behaviour.

24. The camera as claimed in claim 22, in which the security system is responsive to biometric data of a user.

25. The camera as claimed in claim 1, further including an image processor that analyses scenes viewed by the camera in accordance with instructions contained in the behaviour and determines, on the basis of the analysis, whether to capture the scene.

26. The camera as claimed in claim 1, wherein the camera is portable.

27. The camera as claimed in claim 1, wherein the camera is wearable.

28. The camera as claimed in claim 1, further including a telecommunications device that exchanges data with one of a local beacon and a remote computing device.

29. The camera as claimed in claim 1, in which the camera is capable of modifying its behaviour, and associating a confidence value with the behaviour, and in which the camera outputs the confidence value with the behaviour.

30. The camera as claimed in claim 29, in which output of the behaviour is inhibited if the confidence value is below a predetermined threshold.

31. The camera as claimed in claim 29, which output of the behaviour requires user intervention if the confidence value is below a predetermined threshold.

32. A teachable camera comprising;
a behaviour memory that stores at least one behaviour controlling automated image analysis and capture of images by the camera; and a behaviour controller that controls output of behaviours from the behaviour memory, said behaviour controller being responsive to indications of geographical position, said behaviour controller being responsive to beacons placed at events or places to indicate that said camera is at an event, said behaviour controller providing for downloading at least one of said behaviours from said beacons, said behaviour controller, prior to implementing said behaviour, checking with one of the user and a download rule base, said behaviour specifying at least one rule for determining whether or not an image should be stored so that it is not discarded as other images are acquired.

33. A teachable camera comprising;
a behaviour memory that stores at least one behaviour controlling automated image analysis and capture of images by the camera; and a behaviour controller that controls output of behaviours from the behaviour memory, said behaviour controller being responsive to indications of geographical position, said behaviour controller being responsive to beacons placed at events or places to indicate that said camera is at an event, said behaviour controller providing for downloading at least one of said behaviours from said beacons, said behaviour controller, prior to downloading a behaviour, checking with one of the user and a download rule base, said behaviour specifying at least one rule for determining whether or not an image should be stored so that it is not discarded as other images are acquired.

34. A behaviour server that stores a plurality of camera behaviours, wherein the behaviour server is arranged to establish a communications channel with a teachable camera, and a user can upload a camera behaviour to the behaviour server, each of said behaviors specifying at least one rule for determining whether or not an image should be stored so that it is not discarded as other images are acquired.

35. The behaviour server as claimed in claim 34, which allows a camera user to select the camera behaviour for download to the camera.

36. A method of modifying operation of a teachable camera having a behaviour memory, the method comprising;
monitoring a position of the camera; and
in response to reaching a predetermined geographical position, implementing a new behaviour, said behavior specifying at least one rule for determining whether or not an image should be stored so that it is not discarded as other images are acquired.

37. A method of modifying operation of a teachable camera having a behaviour memory, the method comprising;
monitoring a position of the camera; and
in response to reaching a predetermined geographical position,
alerting a user to the option of implementing a new behaviour, said behavior specifying at least one rule for determining whether or not an image should be stored so that it is not discarded as other images are acquired.

38. A teachable camera comprising a behaviour memory storing at least one behaviour that controls at least automated image analysis and capture of images by the camera, wherein the camera is responsive to geographical position, and in response to reaching a predetermined geographical position, the camera implements a new behaviour, said behaviour specifying at least one rule for determining whether or not an image should be stored so that it is not discarded as other images are acquired.

39. A teachable camera comprising a behaviour memory storing at least one behaviour that controls at least automated image analysis and capture of images by the camera, wherein the camera is responsive to geographical position, and in response to reaching a predetermined geographical position, the camera alerts a user to the option of implementing a new behaviour, said behaviour specifying at least one rule for determining whether or not an image should be stored so that it is not discarded as other images are acquired.

40. A method of modifying operation of a teachable camera having a behaviour memory, the method comprising:
monitoring presence of at least one beacon; and
in response to being in the presence of the beacon, implementing a new behaviour, said behaviour specifying at least one rule for determining whether or not an image should be stored so that it is not discarded as other images are acquired.

41. The method as claimed in claim 40, in which the new behaviour is downloaded from the beacon.

42. A method of modifying operation of a teachable camera having a behaviour memory, the method comprising:
monitoring presence of at least one beacon; and
in response to being in the presence of the beacon, alerting a user to the option of implementing a new behaviour, said behaviour specifying at least one rule for determining whether or not an image should be stored so that it is not discarded as other images are acquired.

43. A teachable camera having a behaviour memory that stores at least one behaviour controlling automated image analysis and capture of images by the camera, wherein the camera is responsive to at least one beacon, and in response to being in the presence of the beacon, the camera implements a new behaviour, said behaviour specifying at least one rule for determining whether or not an image should be stored so that it is not discarded as other images are acquired.

44. The camera as claimed in claim 43, wherein the new behaviour is downloaded from the beacon.

45. A teachable camera having a behaviour memory that stores at least one behaviour controlling automated image analysis and capture of images by the camera, wherein the camera is responsive to at least one beacon, and in response to being in the presence of the beacon, the camera alerts a user to the option of implementing a new behaviour, said behaviour specifying at least one rule for determining whether or not an image should be stored so that it is not discarded as other images are acquired.

46. A teachable mobile device comprising:

a behaviour memory that stores at least one behaviour for controlling automated image analysis and capture of images by the mobile device; and a behaviour exchange controller that controls the exchange of behaviours with the behaviour memory, including output of behaviours from the behaviour memory, each of said behaviours specifying at least one rule for determining whether or not an image should be stored so that it is not discarded as other images are acquired.

47. A system of modifying operation of a teachable camera having a behaviour memory, comprising:

means for monitoring presence of at least one beacon; and in response to being in the presence of the beacon, means for implementing a new behaviour, each of said behaviours specifying at least one rule for determining whether or not an image should be stored so that it is not discarded as other images are acquired.

48. The system as claimed in claim 47, further comprising means for downloading from the beacon the new behaviour.

49. The system as claimed in claim 47, further comprising means for alerting a user to the option of implementing the new behaviour.

50. A teachable camera comprising:

an image sensor for acquiring images;

internal storage for storing images captured by said image sensor and for storing one or more behaviours specifying rules for determining whether or not an image should be stored so that it is not discarded as other images are acquired by said image sensor; and a controller for implementing said a rule specified by a behavior stored in said memory to determine whether an image captured by said image sensor is to be stored in said memory, said controller providing for downloading said behavior from a source device external to said camera or uploading said behavior to a target device external to said camera.

51. A camera as recited in claim 50 wherein said controller also provides for uploading said behavior from said camera to a target device external to said camera.

52. A method comprising:

downloading to a memory of a teachable camera for storage therein a first behavior specifying at least a first rule for determining whether or not to store an image acquired by said camera is to be stored in said camera so that it is not discarded as other images are acquired by said camera;

acquiring images by said camera;

storing in said memory or discarding said images according to said first behavior; and uploading from said memory of said camera to an external device a second behavior specifying at least a second rule for determine whether or not to store an image acquired by said camera is to be stored in said camera so that it is not discarded as other images are acquired by said camera.

* * * * *

UNITED STATES PATENT AND TRADEMARK OFFICE
CERTIFICATE OF CORRECTION

| | | |
|---|---|---|
| PATENT NO. | : 7,742,625 B2 | Page 1 of 1 |
| APPLICATION NO. | : 10/868544 | |
| DATED | : June 22, 2010 | |
| INVENTOR(S) | : Maurizio Pilu | |

It is certified that error appears in the above-identified patent and that said Letters Patent is hereby corrected as shown below:

On the Title Page, Item [54] and in the Specification, Column 1, in the Title, before "AUTONOMOUS" insert -- AN --.

Signed and Sealed this
Thirty-first Day of March, 2015

Michelle K. Lee
*Director of the United States Patent and Trademark Office*